United States Patent [19]
Nakamura

[11] Patent Number: 6,088,538
[45] Date of Patent: Jul. 11, 2000

[54] ZOOM FINDER

[75] Inventor: Yoshikazu Nakamura, Chiba, Japan

[73] Assignee: Asahi Kogaku Kogyo Kabushiki Kaisha, Tokyo, Japan

[21] Appl. No.: 09/258,158

[22] Filed: Feb. 26, 1999

[30] Foreign Application Priority Data

Mar. 3, 1998 [JP] Japan .................................. 10-051067

[51] Int. Cl.$^7$ .................................................. G03B 17/00
[52] U.S. Cl. ............................................. 396/84; 396/379
[58] Field of Search ...................................... 396/84, 379

[56] References Cited

U.S. PATENT DOCUMENTS

| | | | |
|---|---|---|---|
| 5,335,030 | 8/1994 | Suzuka | 396/84 |
| 5,337,109 | 8/1994 | Ogawa | 396/379 |
| 5,634,147 | 5/1997 | Machida | 396/84 |
| 5,678,090 | 10/1997 | Nishimura et al. | 396/379 |
| 5,678,093 | 10/1997 | Asakura et al. | 396/379 |
| 5,692,227 | 11/1997 | Yokota et al. | |
| 5,740,474 | 4/1998 | Ogawa | |
| 5,778,262 | 7/1998 | Kobayashi et al. | 396/84 |
| 5,790,908 | 8/1998 | Matsuda | 396/379 |
| 5,819,121 | 10/1998 | Tsuboi | 396/84 |
| 5,832,317 | 11/1998 | Shimizu | 396/84 |
| 5,848,302 | 12/1998 | Machida | 396/379 |
| 5,884,106 | 3/1999 | Manabe | 396/84 |
| 5,940,632 | 8/1999 | Tsuboi | 396/84 |

Primary Examiner—Russell Adams
Attorney, Agent, or Firm—Greenblum & Bernstein, P.L.C.

[57] ABSTRACT

A zoom finder includes a finder optical system in which at least one lens group is moveable in the optical axis direction thereof to perform the zooming operation; a guide shaft which extends in parallel with the optical axis; a lens mount member which supports the movable lens group and through which the guide shaft extends to support the lens mount member to move in the optical axis direction; and a drive cam which is rotatably supported by the guide shaft, so that the lens mount member moves in the optical axis direction in association with the rotation of the drive cam.

16 Claims, 5 Drawing Sheets

ZOOM FINDER

BACKGROUND OF THE INVENTION

1. Field of the Invention

The present invention relates to a camera having a finder optical system separate from a photographing optical system, and in particular relates to a zoom finder which is actuated in association with the zooming operation of the photographing optical system.

2. Description of the Related Art

In a camera having a view finder separate from a photographing optical system which is capable of zooming, it is preferable that the view finder be a zoom finder which is actuated in association with the zooming operation of the photographing optical system so as to visually confirm the angle of view which varies in accordance with the zooming operation. In such a zoom finder system, it is necessary to provide a mechanism which moves a variable power lens (or a plurality of power lenses) within the finder optical system along the optical axis. To this end, a support mechanism which supports the movable lens element(s) to move along the optical axis and a drive mechanism which moves the movable lens element are provided. The known support mechanism includes a guide shaft which extends in the optical axis direction of the photographing optical system and a lens frame which supports the movable lens element to move along the guide shaft. The known drive mechanism also includes a gear mechanism or a cam mechanism which moves the movable lens element in the optical axis direction, using the rotational force of a drive source such as a motor transmitted thereto.

In conventional zoom finders, the support mechanism and the drive mechanism are individually made of separate components. Consequently, the number of the components is increased and the components must be designed and arranged so as not to interfere with each other; consequently, neither miniaturization of the zoom finder nor reduction of the manufacturing cost thereof can be adequately achieved.

In particular, the guide shaft which movably supports the movable lens element and the rotational shaft which supports the gear mechanism or cam mechanism and which is independent from the guide shaft are spaced at a predetermined distance to extend in parallel within the finder so that no interference between the guide shaft and the rotational shaft occurs. This makes it difficult to miniaturize the finder. In recent trends, the photographing optical system or the finder optical system is assembled as a unit or a block, so that the elements thereof can be commonly used for different kinds of cameras. To this end, a miniaturization of the finder has become necessary.

SUMMARY OF THE INVENTION

It is an object of the present invention to provide a zoom finder having less number of components, which can be made small.

To achieve the object mentioned above, according to the present invention, there is provided a zoom finder including: a finder optical system in which at least one lens group is moveable in the optical axis direction thereof to perform the zooming operation; a guide shaft which extends in parallel with the optical axis; a lens mount member which supports the movable lens group and through which the guide shaft extends to support the lens mount member to move in the optical axis direction; and a drive cam which is rotatably supported by the guide shaft, so that the lens mount member moves in the optical axis direction in association with the rotation of the drive cam.

Preferably, the guide shaft is provided with a spring to bias the lens mount member in the optical axis direction.

Preferably the drive cam includes a cylindrical body which is provided on the peripheral surface thereof with a cam groove in which a cam projection integrally provided on the lens mount member is engaged with, wherein the lens mount member moves along the guide shaft in accordance with the rotation of the drive cam.

Preferably, the drive cam is coaxially provided with a drive gear integral therewith, wherein the drive cam is rotated due to a rotational force of a drive source transmitted to the drive gear.

Preferably, the zoom finder is mounted to a camera, the camera being provided with a photographing zoom optical system which is capable of zooming and a drive motor for moving the zoom optical system, wherein the drive motor is connected to the drive gear of the drive cam when the zoom finder is mounted to the camera.

According to another aspect of the present invention there is provided a zoom finder having at least one movable lens group that is movable in the optical axis direction to perform the zooming operation, the zoom finder including: a lens mount member which supports the movable lens group; a rotational drive cam that moves the lens mount member in the optical axis direction in association with the rotation thereof; and a common guide shaft that commonly supports the lens mount member and the rotational drive cam so that the lens mount member is linearly movable along the shaft and the rotational drive cam is rotatable about the shaft wherein no axial movement relative to the shaft thereof occurs.

Preferably, the rotational drive cam is provided on the peripheral surface thereof with a cam groove in which a cam projection integrally provided on the lens mount member is engaged with, wherein the lens mount member moves along the guide shaft in accordance with the rotation of the drive cam.

Preferably, the guide shaft is provided with a spring to bias the lens mount member in the optical axis direction wherein the cam projection is engaged with the cam groove without any play.

In a zoom finder according to the present invention, since the shaft member which guides the lens mount member which in turn supports the lens of the finder optical system to move in the optical axis direction and the shaft member about which the drive cam to move the lens mount member in the optical axis direction rotates are realized by the single guide shaft, the finder of the present invention can be simplified and the number of the components can be reduced, thus resulting in an inexpensive and small zoom finder, in comparison with an arrangement in which the shafts are individually provided. Moreover, since the lens mount member and the drive cam are biased by the coil spring on the guide shaft in the optical axis direction, any play between the lens mount member and the drive cam in the optical axis direction can be absorbed, thus resulting in a stable zooming operation.

The present disclosure relates to subject matter contained in Japanese Patent Application No. 10-51067 (filed on Mar. 3, 1998) which is expressly incorporated herein by reference in its entirety.

BRIEF DESCRIPTION OF THE DRAWINGS

The invention will be discussed below in detail with reference to the accompanying drawings, in which.

DETAILED DESCRIPTION OF THE PREFERRED EMBODIMENTS

Figure 1:
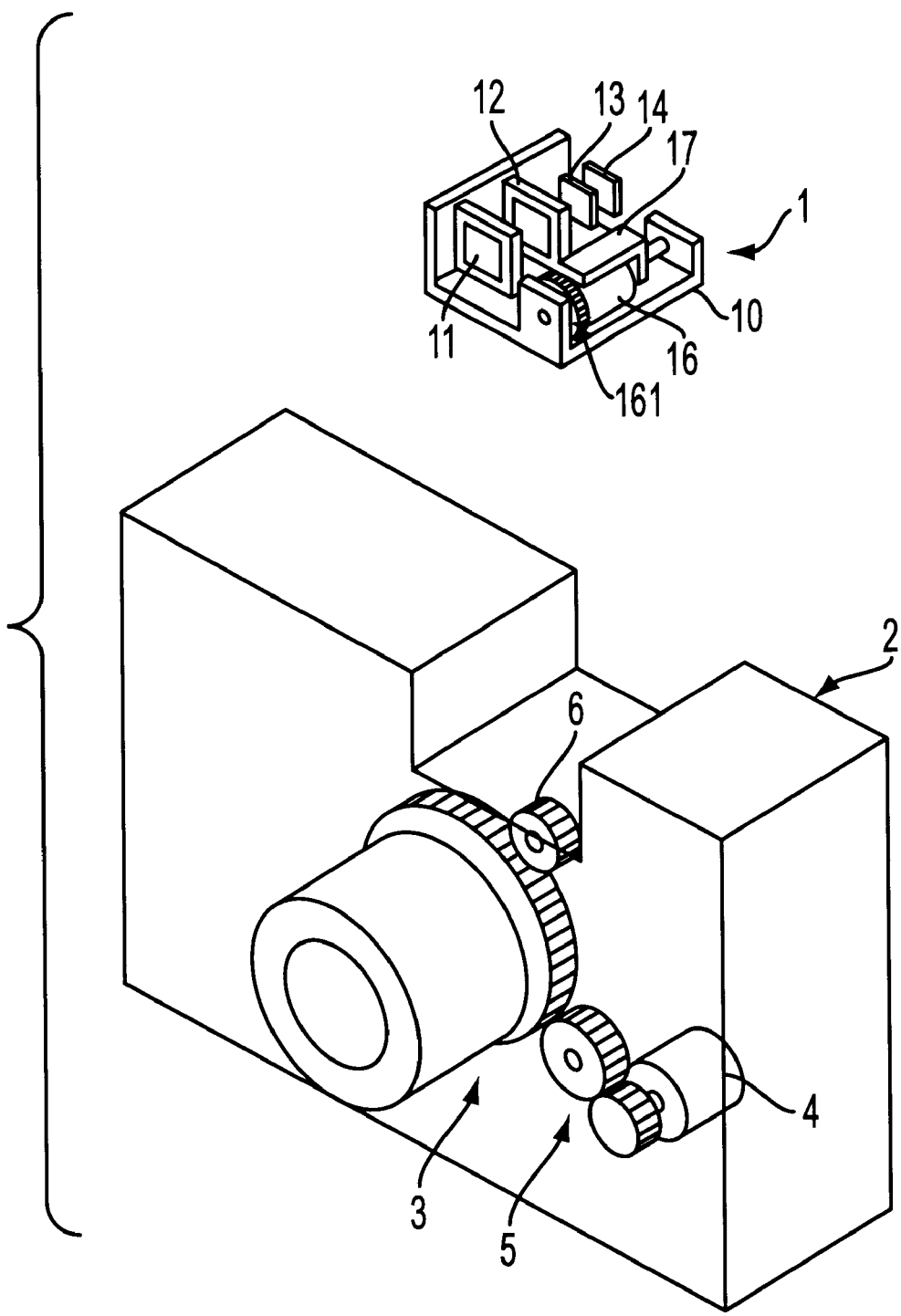
FIG. 1 is a schematic view of a camera to which a zoom finder of the present invention is applied.

In the perspective view of an embodiment of the present invention shown in FIG. 1, a zoom finder 1 is formed as a unit or block which can be incorporated in a camera body 2 to provide a view finder for the camera. The camera body 2 is provided therein with a photographing optical system 3 which is capable of zooming. The photographing optical system 3 is driven by a drive motor 4 incorporated in the camera body 2 to carry out the zooming operation. The zoom finder 1 performs the zooming operation in association with the zooming operation of the photographing optical system 3, as will be discussed below.

Figure 2:
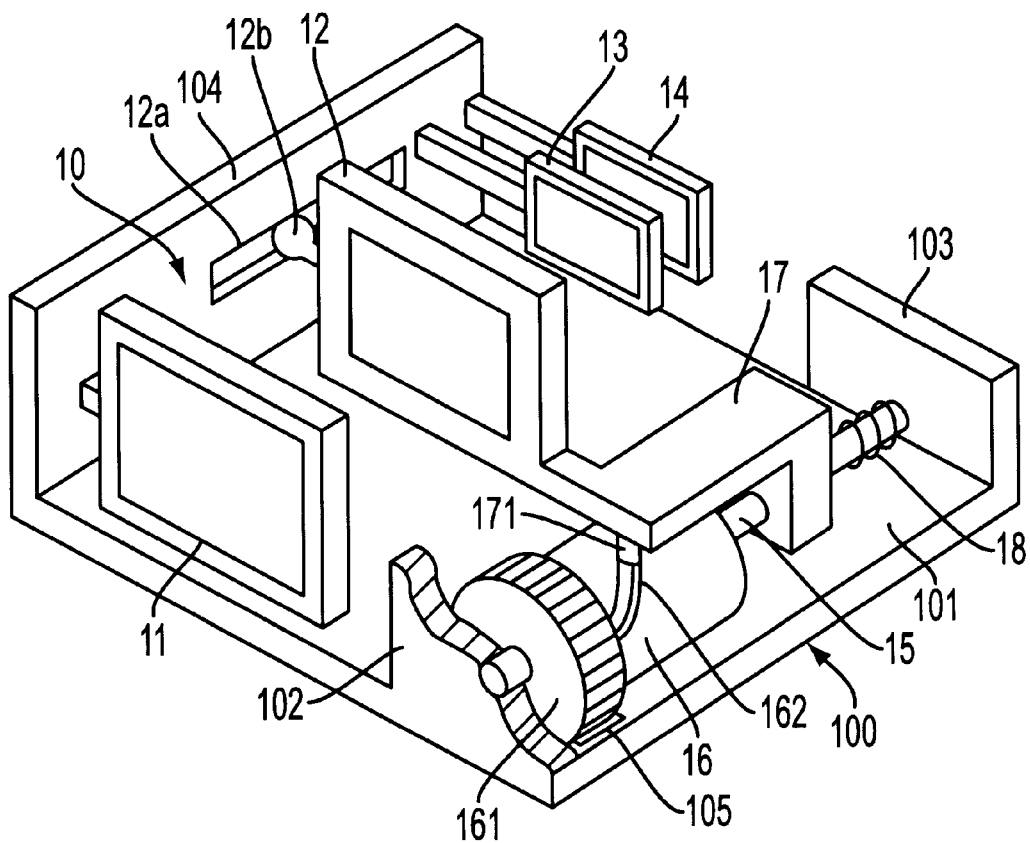
FIG. 2 is a perspective view of a zoom finder according to the present invention.
Figure 3:
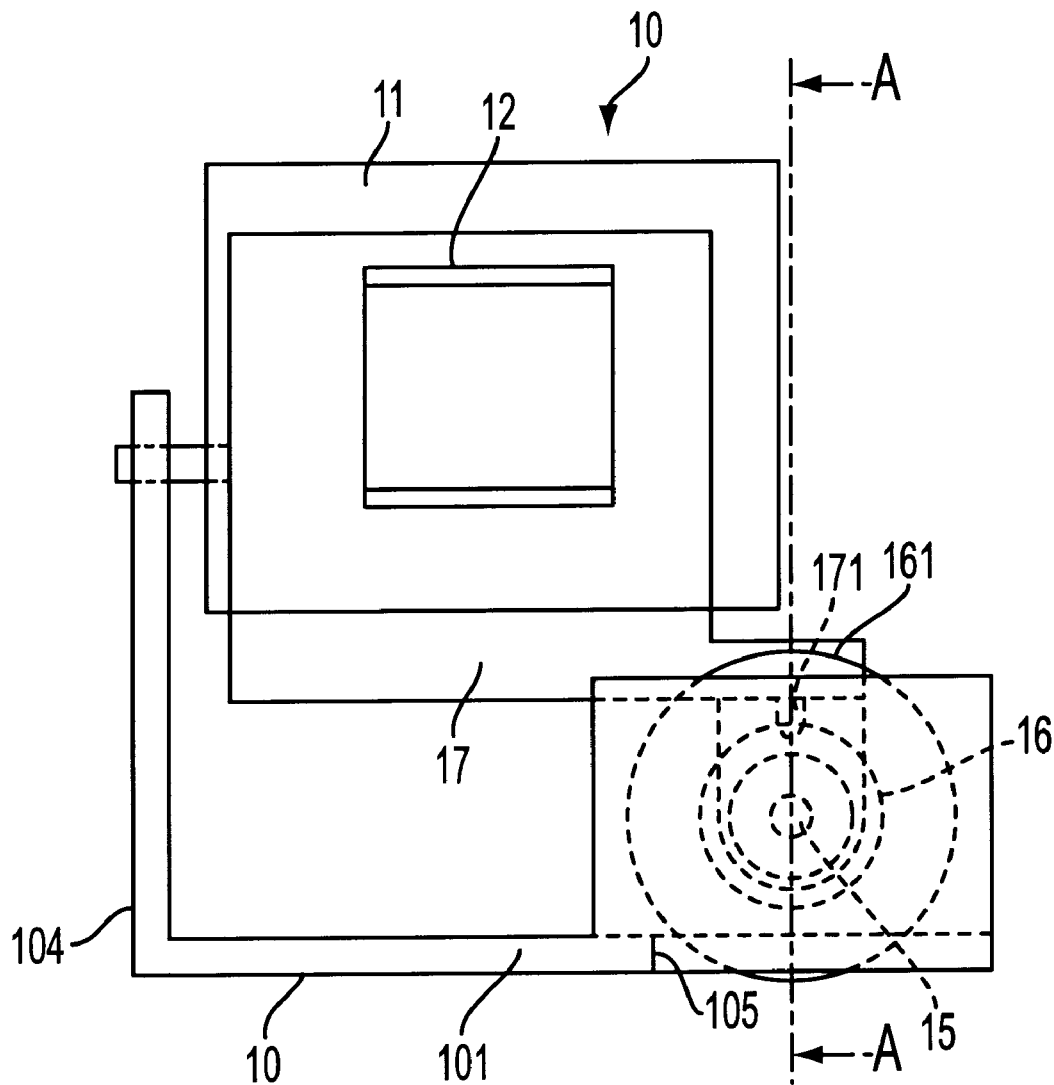
FIG. 3 is a front elevational view of FIG. 2.
Figure 4:
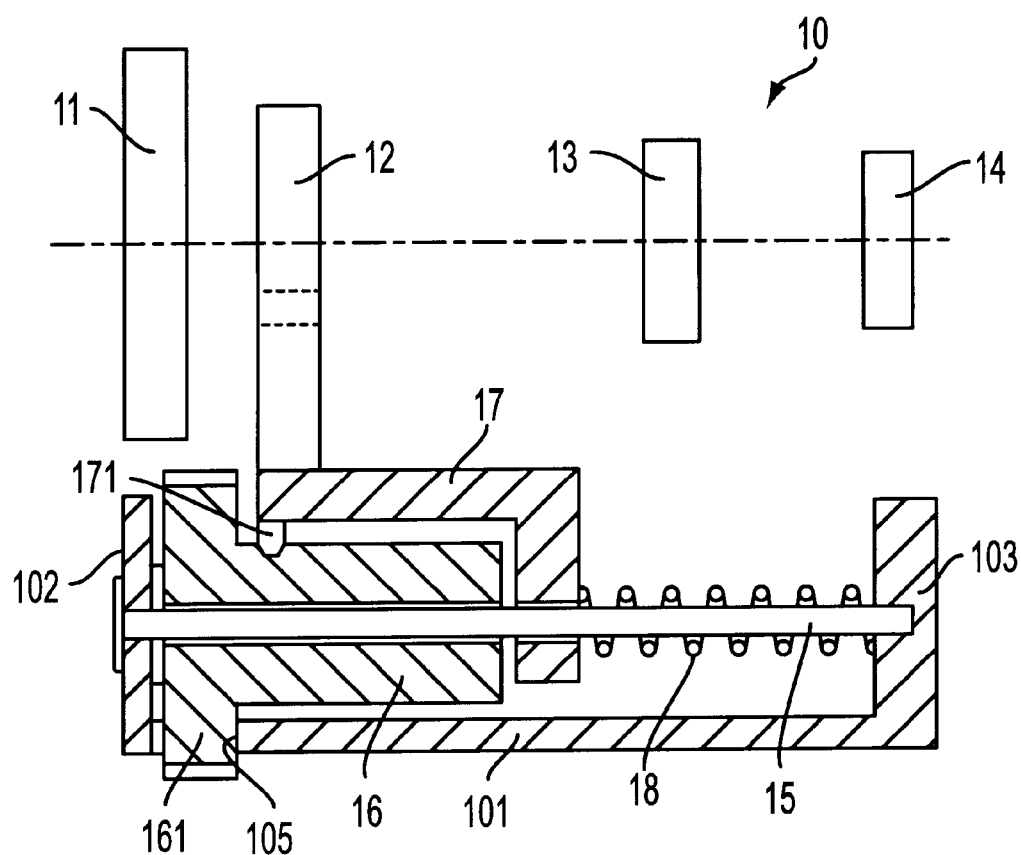
FIG. 4 is a sectional view taken along the line A—A in FIG. 3.
Figure 5:
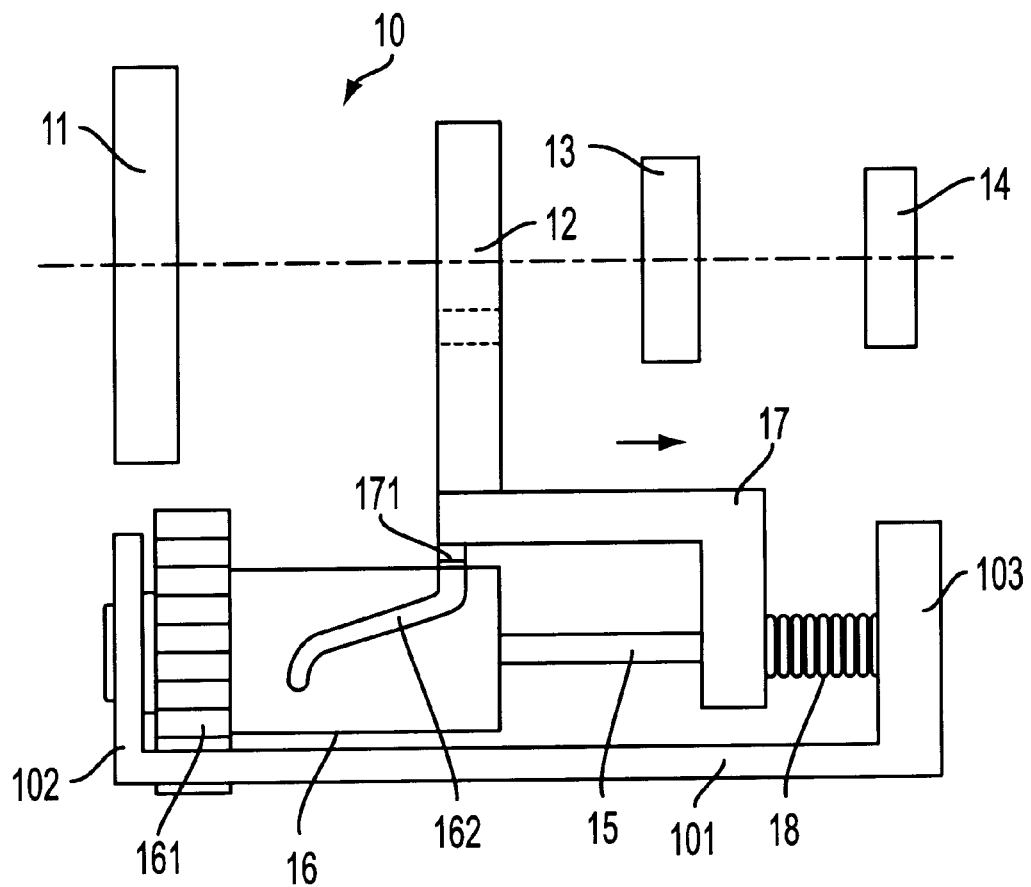
FIG. 5 is a side elevational view of a zoom finder upon zooming.

As can be seen in FIGS. 2 and 3 which show a perspective view and a front elevational view of the zoom finder, respectively, and FIG. 4 which shows a sectional view taken along the line A—A in FIG. 3, the zoom finder 1 is provided with a finder frame 100 which includes a bottom flat plate 101, a front wall 102, a rear wall 103 and a side wall 104. Four rectangular lens elements (groups) 11 through 14 which constitute a finder optical system 10 are arranged along the same optical axis along the inner surface of the side wall 104. The first lens element (group) 11 which constitutes an objective lens, the third lens element (group) 13 which constitutes a converging lens, and the fourth lens element (group) 14 which constitutes an eyepiece are immovable. Namely, first, third and fourth lens frames of the first, third and fourth lenses are immovably secured to the side wall 104. The second lens element (group) 12 is a variable power lens (group) which is movable in the optical axis direction, so that the lens frame therefor is integrally connected to a lens mount member 17 which is movable in the optical axis direction.

A slot 12a is provided in the side wall 104 which extends in the axial direction, the length thereof corresponding with the scope of movement of the lens frame (of the second lens element 12). A pin 12b, which is provided on the side of the lens frame wherein the lens mount member 17 is not provided, snugly fits into the slot 12a and moves along therein in accordance with the movement of the lens frame (of the second element 12). The upper and lower portions of the head of the pin 12b which are in sliding contact with the upper and lower surfaces of the slot 12a are substantially spherical in order to reduce the friction therebetween.

Specifically, a guide shaft 15 is provided between the front wall 102 and the rear wall 103 in the vicinity of the four lenses 11 through 14 which constitutes the finder optical system 10. The guide shaft 15 is secured at the front and rear ends thereof to the front wall 102 and the rear wall 103. The guide shaft 15 rotatably supports a cylindrical drive cam 16 at the front side. The rear side of the guide shaft 15 extends through the lens mount member 17 in the optical axis direction. The lens mount member 17 is made of a generally L-shaped bracket. A coil spring 18, which applies spring-force in the axial direction against the front side of the rear wall 103, is provided to wind around the guide shaft 15 between the lens mount member 17 and the rear wall 103 so as to bias the lens mount member 17 in the axial direction. The drive cam 16 is provided on its front end with a drive gear 161 integral therewith. The drive gear 161 is partially exposed to the lower surface of the bottom plate 101 through an opening 105 formed in the bottom plate 101. The axial position of the drive cam 16 with respect to the guide shaft 15 is defined, for example, by the engagement of the drive gear 161 and the opening 105 so that the relative axial movement between the drive cam 16 and the guide shaft 15 never occurs. It is also possible to employ other structures per se known which prevents relative axial movement between the drive cam 16 and the guide shaft 15 from occurring. The cylindrical surface of the drive cam 16 is provided with a cam groove 162 in which a cam projection 171 provided on the inner surface of the lens mount member 17 at the front end thereof is slidably fitted.

The photographing optical system 3 of the camera body 2 performs the zooming operation by means of a gear train 5 consisting of a plurality of gears, and is connected to the drive shaft of the drive motor 4. The gear train 5 is provided with an association gear 6, so that when the zoom finder 1 is incorporated in the camera body 2, the drive gear 161 of the zoom finder 1 is engaged with the association gear 6.

In the zoom finder 1 as constructed above, when the zoom finder 1 provided as a block or unit is incorporated in the camera body 2 shown in FIG. 1, the drive gear 161 is in mesh with the association gear 6, so that the drive gear 161 is rotated by the association gear 6. Consequently, the drive gear 161 of the zoom finder 1 and hence the drive cam 16 is rotated in association with the zooming operation of the photographing optical system 3 by the drive motor 4. When the rotation of the drive gear 161 takes place, the drive cam 16 integral therewith is rotated about the guide shaft 15. Thus, the lens mount member 17 whose cam projection 171 is fitted in the cam groove 162 formed on the peripheral surface of the drive cam 16 is moved on the guide shaft 15 in the optical axis direction in accordance with the profile of the cam groove 162. Since the lens mount member 17 is biased by the coil spring 18 toward the front end side, the cam projection 171 is stably engaged in the cam groove 162, and hence the movement of the lens mount member 17 takes place without any play. The movement of the lens mount member 17 along the guide shaft 15 causes the second lens element (group) 12 supported by the lens mount member 17 to move in the optical axis direction, so that the zooming operation of the finder optical system can be carried out.

Therefore, in the zoom finder, the common guide shaft 15 functions not only as the shaft member which supports the lens mount member 17 which in turn supports the second lens element (group) 12 to move in the optical axis direction, but also as the shaft member which the drive cam 16 and the drive gear 161 rotate about to move the lens mount member 17 in the optical axis direction. As a result, in comparison with an arrangement of the prior art in which the shafts are individually provided, the finder of the present invention can be simplified and the number of the components can be reduced, thus resulting in an inexpensive and small zoom finder. Moreover, the lens mount member 17 and the drive cam 16 are supported by the single guide shaft 15 and the lens mount member 17 is continuously biased in the forward direction by the coil spring 18 positioned about the guide shaft 15, so that the biasing force of the coil spring 18 is transmitted to the drive cam 16 through the engagement of the cam projection 171 integral with the lens mount member 17 and the cam groove 162. Consequently, play between the lens mount member 17 and the drive cam 16 which would be otherwise produced is absorbed by the single coil spring 18, so that the zooming operation can be stably carried out.

The lens arrangement of the finder optical system, the shape of the lens mount member, and the shape of the drive cam etc., can be appropriately modified. In particular, if there is ample freedom of design in the arrangement of the drive gear and the association gear when the finder is mounted to the camera, the guide shaft can be located directly below the optical axis of the finder optical system to reduce the size of the camera in the lateral direction.

In the embodiment mentioned above, only one lens element (group) 12 includes the variable power lens (group) of the zoom finder optical system. In an alternative, two or more lenses can be the variable power lenses which are moved in the optical axis direction. In this alternative, two or more lens frames for the variable power lenses are guided by the common shaft 15 and the drive cam 16 provides with corresponding cam grooves for the lens frames.

As may be understood from the above discussion, according to the present invention, since the shaft member which guides the lens mount member which in turn supports the lens of the finder optical system to move in the optical axis direction and the shaft member about which the drive cam to move the lens mount member in the optical axis direction rotates are realized by the single guide shaft, the finder of the present invention can be simplified and the number of the components can be reduced, thus resulting in an inexpensive and small zoom finder in comparison with an arrangement in which the shafts are individually provided. Moreover, since the lens mount member and the drive cam are biased by the coil spring on the guide shaft in the optical axis direction, play between the lens mount member and the drive cam in the optical axis direction is absorbed by the coil spring, thus resulting in a stable zooming operation.

What is claimed is:

1. A zoom finder comprising:
   a finder optical system in which at least one lens group is moveable in the optical axis direction thereof to perform the zooming operation;
   a guide shaft which extends in parallel with the optical axis;
   a lens mount member which supports said movable lens group and through which said guide shaft extends to support the lens mount member to move in the optical axis direction; and
   a drive cam which is rotatably supported by said guide shaft, wherein said lens mount member moves in the optical axis direction in association with the rotation of the drive cam.

2. A zoom finder according to claim 1, wherein said guide shaft is provided with a spring to bias the lens mount member in the optical axis direction.

3. A zoom finder according to claim 1, wherein said drive cam comprises a cylindrical body which is provided on the peripheral surface thereof with a cam groove in which a cam projection integrally provided on the lens mount member is engaged with, wherein said lens mount member moves along the guide shaft in accordance with the rotation of the drive cam.

4. A zoom finder according to claim 3, wherein said drive cam is coaxially provided with a drive gear integral therewith, wherein the drive cam is rotated due to a rotational force of a drive source transmitted to the drive gear.

5. A zoom finder according to claim 4, wherein said zoom finder is mounted to a camera, said camera being provided with a photographing zoom optical system which is capable of zooming and a drive motor for moving said zoom optical system, wherein said drive motor is connected to said drive gear of the drive cam when the zoom finder is mounted to the camera.

6. A zoom finder having at least one movable lens group that is movable in the optical axis direction to perform the zooming operation, said zoom finder comprising:
   a lens mount member which supports said movable lens group;
   a rotational drive cam that moves said lens mount member in the optical axis direction in association with the rotation thereof;
   a common guide shaft that commonly supports said lens mount member and said rotational drive cam so that the lens mount member is linearly movable along the shaft and the rotational drive cam is rotatable about the shaft, wherein no axial movement of said rotational drive cam relative to the shaft occurs; and
   a spring coaxially positioned about said guide shaft, said spring configured to bias said lens mount member in the optical axis direction.

7. A zoom finder according to claim 6, wherein said rotational drive cam is provided on the peripheral surface thereof with a cam groove in which a cam projection integrally provided on the lens mount member is engaged with, wherein said lens mount member moves along the guide shaft in accordance with the rotation of the drive cam.

8. A zoom finder comprising:
   a finder optical system in which at least one lens group is moveable along an optical axis direction to perform a zooming operation;
   a common guide shaft which extends in parallel with the optical axis;
   a lens mount member which supports a movable lens element of said movable lens group and through which said common guide shaft extends to support the lens mount member to move in the optical axis direction;
   a drive cam which is rotatably supported by and mounted about said common guide shaft, wherein said lens mount member moves in the optical axis direction in association with the rotation of the drive cam; and
   a coil spring coaxially positioned about said common guide shaft, said coil spring configured to bias said lens mount member in the optical axis direction, both said drive cam and said coil spring being coaxially provided about said common guide shaft.

9. The zoom finder according to claim 8, wherein said drive cam comprises a cylindrical body which is provided, on a peripheral surface, with a cam groove in which a cam projection, provided on the lens mount member, is engaged, wherein said lens mount member moves along the guide shaft in accordance with the rotation of the drive cam.

10. The zoom finder according to claim 9, wherein said drive cam is coaxially provided with a drive gear, wherein the drive cam is rotated by a rotational force of a drive source transmitted to the drive gear.

11. The zoom finder according to claim 10, wherein said zoom finder is mounted to a camera, said camera being provided with a photographing zoom optical system which is capable of zooming and a drive motor for moving said zoom optical system, wherein said drive motor is connected to said drive gear of the drive cam when the zoom finder is mounted to the camera.

12. The zoom finder according to claim 8, wherein said guide shaft has a first end facing in an object direction, and a second end extending in an image direction, said drive cam being positioned towards said first end.

13. The zoom finder according to claim 8, wherein said guide shaft has a first end facing in an object direction, and a second end extending in an image direction and supported by a rear wall of said finder optical system, said coil spring being positioned about said guide shaft between said lens mount member and said rear wall.

14. The zoom finder according to claim 8, wherein said lens mount member is generally "L"-shaped.

15. The zoom finder according to claim 9, wherein said cam projection is provided on a lower surface of said lens mount member at a front end of said surface.

16. The zoom finder according to claim 9, wherein said lens mount member has a rear end supported by said guide shaft.

* * * * *